US012669770B2

(12) United States Patent
Wakasa et al.

(10) Patent No.: US 12,669,770 B2
(45) Date of Patent: Jun. 30, 2026

(54) CONTROL METHOD OF IMAGE FORMING APPARATUS TO DETERMINE CLEANING PORTION PERFORMANCE, AND IMAGE FORMING APPARATUS

(71) Applicant: KYOCERA Document Solutions Inc., Osaka (JP)

(72) Inventors: Yohei Wakasa, Osaka (JP); Keiya Nishimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 153 days.

(21) Appl. No.: 18/849,226

(22) PCT Filed: Jan. 12, 2023

(86) PCT No.: PCT/JP2023/000525
§ 371 (c)(1),
(2) Date: Apr. 10, 2025

(87) PCT Pub. No.: WO2023/181592
PCT Pub. Date: Sep. 28, 2023

(65) Prior Publication Data

US 2026/0029741 A1 Jan. 29, 2026

(30) Foreign Application Priority Data

Mar. 22, 2022 (JP) ................................ 2022-045309

(51) Int. Cl.
*G03G 15/00* (2006.01)
*G03G 15/01* (2006.01)
*G03G 21/00* (2006.01)

(52) U.S. Cl.
CPC ..... *G03G 15/5054* (2013.01); *G03G 15/0131* (2013.01); *G03G 15/0189* (2013.01); *G03G 21/0058* (2013.01)

(58) Field of Classification Search
None
See application file for complete search history.

(56) References Cited

U.S. PATENT DOCUMENTS 8,275,273 B2 * 9/2012 Thayer ............... G03G 15/5058 399/72
2015/0117882 A1 4/2015 Wakamatsu et al.
2023/0305468 A1 * 9/2023 Wakasa ............. G03G 21/0058

FOREIGN PATENT DOCUMENTS

JP 2015087416 A 5/2015

* cited by examiner

*Primary Examiner* — Arlene Heredia Ocasio
(74) *Attorney, Agent, or Firm* — Alleman Hall LLP

(57) ABSTRACT

A processor (81) acquires an output image concentration that is a detection concentration of a concentration detection portion (5) for a first toner image. The processor (81) causes a cleaning portion (45) to execute toner recovery processing when a second toner image passes through a recovery member (451). The processor (81) causes the cleaning portion (45) to execute toner release processing. The processor (81) acquires a release toner concentration that is a detection concentration of the concentration detection portion (5) for release toner. The processor (81) compares the output image concentration and the release toner concentration to derive an index value of toner release performance of the recovery member (451).

6 Claims, 4 Drawing Sheets

CONTROL METHOD OF IMAGE FORMING APPARATUS TO DETERMINE CLEANING PORTION PERFORMANCE, AND IMAGE FORMING APPARATUS

TECHNICAL FIELD

The present invention relates to a control method of an image forming apparatus and an image forming apparatus with which performance of a cleaning portion which recovers residual toner from a surface of a photoconductor can be evaluated.

BACKGROUND

An image forming apparatus that uses electrophotography forms a toner image on a surface of a photoconductor and transfers the toner image onto a sheet from the photoconductor. The image forming apparatus includes a cleaning portion which recovers residual toner from the surface of the photoconductor.

The cleaning portion may include a recovery member and a recovery voltage output portion (see, for example, Patent Literature 1). The recovery member is arranged in contact with the surface of the photoconductor and is capable of retaining toner. For example, the recovery member is a porous member such as a sponge.

The recovery voltage output portion is capable of applying a recovery bias voltage or a release bias voltage to the recovery member. The recovery bias voltage is a bias voltage having a polarity different from a charging polarity of the toner. The release bias voltage is a bias voltage having a polarity that is the same as the charging polarity of the toner.

By applying the recovery bias voltage to the recovery member, the toner remaining on the surface of the photoconductor is electrically drawn to the recovery member. The drawn toner is retained by the recovery member.

By the accumulation of the toner in the recovery member, toner recovery performance of the recovery member is lowered.

On the other hand, by applying the release bias voltage to the recovery member, the toner retained by the recovery member is released to the photoconductor. Thus, the toner recovery performance of the recovery member is improved.

The toner released from the recovery member is carried by the photoconductor to be recovered by a developing device.

CITATION LIST

Patent Literature

Patent Literature 1: Japanese Patent Application Publication No. 2015-87416

SUMMARY

Technical Problem

Incidentally, due to repetitions of the toner recovery and toner release by the recovery member, toner release performance of the recovery member is gradually lowered. When the toner release performance of the recovery member is lowered, the toner recovery performance of the recovery member is also lowered. If the performance of the recovery member is lowered, there is a fear that useless toner will remain on the surface of the photoconductor.

The residual toner on the surface of the photoconductor becomes a cause of poor print image quality. Meanwhile, when the performance of the recovery member is evaluated correctly, the deteriorated performance of the recovery member can be compensated for by correcting a control parameter.

For example, by performing the correction such that the recovery bias voltage becomes large, the deteriorated performance of the recovery member can be compensated for.

The present invention aims at providing a control method of an image forming apparatus and an image forming apparatus with which performance of a recovery member which recovers toner on a surface of a photoconductor can be evaluated correctly.

Solution to Problem

A method according to an aspect of the present invention is a control method of an image forming apparatus. The image forming apparatus includes an image forming portion, a transfer portion, a cleaning portion, and a concentration detection portion. The image forming portion includes a photoconductor that rotates, and is capable of forming a toner image on a surface of the photoconductor. The transfer portion includes an intermediate transfer member that rotates, and is capable of executing primary transfer processing for transferring the toner image formed on the surface of the photoconductor onto a surface of the intermediate transfer member at a primary transfer position and secondary transfer processing for transferring the toner image formed on the surface of the intermediate transfer member onto a sheet at a secondary transfer position. The cleaning portion is capable of executing toner recovery processing for recovering toner present at a portion of the surface of the photoconductor that has passed through the primary transfer position and toner release processing for releasing recovered toner to the surface of the photoconductor. The concentration detection portion detects a concentration of the toner image on the intermediate transfer member. The cleaning portion includes a recovery member and a recovery voltage output portion. The recovery member rotates while being in contact with the surface of the photoconductor and is capable of retaining the toner. The recovery voltage output portion applies a recovery bias voltage having a polarity different from a charging polarity of the toner to the recovery member in the toner recovery processing, and applies a release bias voltage having a polarity that is the same as the charging polarity of the toner to the recovery member in the toner release processing. The control method includes causing, by a processor, the image forming portion to execute first image output processing for forming a first toner image on the surface of the photoconductor. The control method further includes causing, by the processor, the transfer portion to execute the primary transfer processing for the first toner image. The control method further includes acquiring, by the processor, an output image concentration that is a detection concentration of the concentration detection portion for the first toner image. The control method further includes causing, by the processor, the image forming portion to execute second image output processing for forming a second toner image that is the same as the first toner image on the surface of the photoconductor. The control method further includes causing, by the processor, the transfer portion to execute non-transfer processing in which the second toner image is not transferred onto the intermediate transfer member. The control method further includes causing, by the processor, the cleaning portion to execute the toner recovery processing when the second toner image passes through the recovery member. The control method further includes causing, by the processor, the cleaning portion to execute the toner release processing after the toner recovery processing corresponding to the second toner image is executed. The control method further includes causing, by the processor, the transfer portion to execute the primary transfer processing for release toner that has been released to the surface of the photoconductor by the toner release processing. The control method further includes acquiring, by the processor, a release toner concentration that is a detection concentration of the concentration detection portion for the release toner that has been transferred onto the surface of the intermediate transfer member. The control method further includes comparing, by the processor, the output image concentration and the release toner concentration to derive an index value of toner release performance of the recovery member.

An image forming apparatus according to another aspect of the present invention includes the image forming portion, the transfer portion, the cleaning portion, the concentration detection portion, and the processor which realizes the control method.

Advantageous Effects of Invention

According to the present invention, it is possible to provide a control method of an image forming apparatus and an image forming apparatus with which performance of a recovery member which recovers toner on a surface of a photoconductor can be evaluated correctly.

DETAILED DESCRIPTION

Hereinafter, an embodiment of the present invention will be described with reference to the drawings. It is noted that the following embodiment is an example of embodying the present invention and does not limit the technical scope of the present invention.

An image forming apparatus 10 according to the embodiment is an apparatus which executes print processing using electrophotography. The print processing is processing of forming an image on a sheet 9. The sheet 9 is an image forming medium such as a paper sheet or a sheet-type resin member.

[Configuration of Image Forming Apparatus 10]

Figure 1:
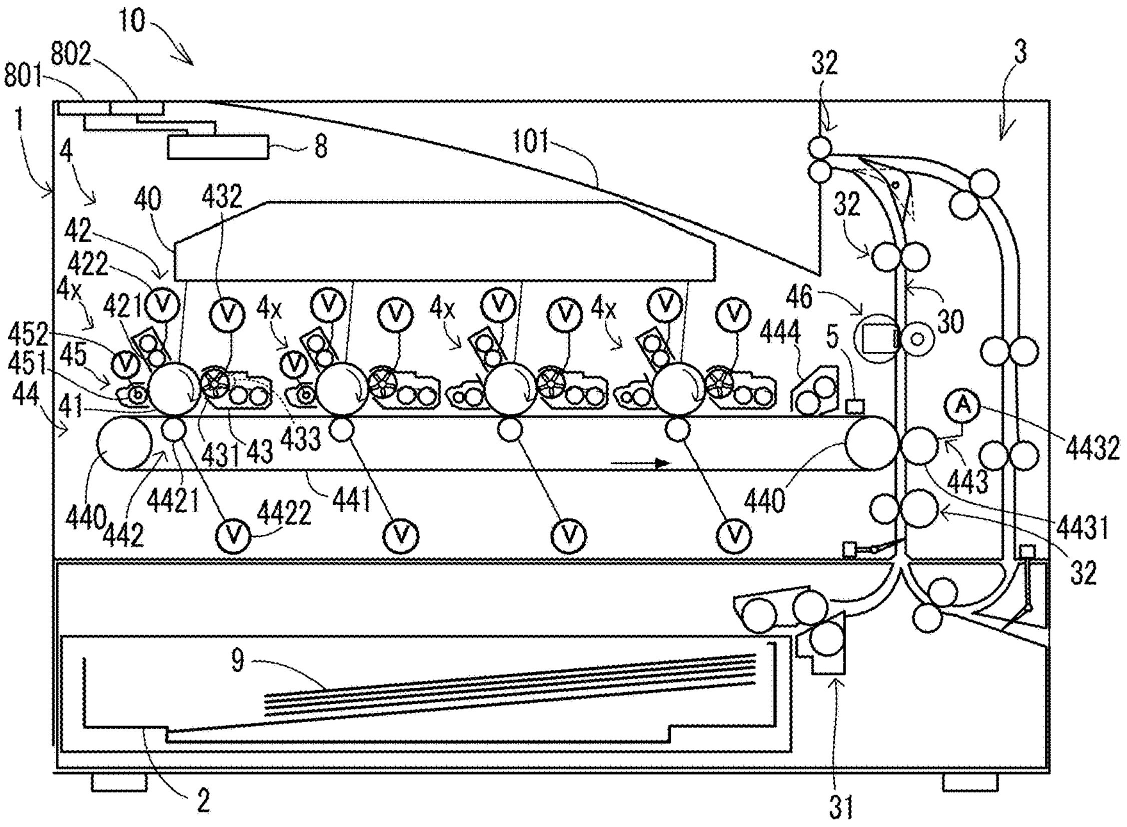
FIG. 1 is a configuration diagram of an image forming apparatus according to an embodiment.

As shown in FIG. 1, the image forming apparatus 10 includes a sheet storing portion 2, a sheet conveying path 30, a sheet conveying device 3, and a printing device 4. In addition, the image forming apparatus 10 also includes an operation device 801, a display device 802, and a control device 8.

The sheet conveying path 30, the sheet conveying device 3, the printing device 4, and the control device 8 are housed in a housing 1.

The sheet storing portion 2 stores the sheets 9. The sheet conveying device 3 feeds the sheet 9 from the sheet storing portion 2 to the sheet conveying path 30 and further conveys the sheet 9 along the sheet conveying path 30.

The sheet conveying device 3 includes a sheet feed mechanism 31 and a plurality of conveying roller pairs 32.

The sheet feed mechanism 31 feeds the sheets 9 stored in the sheet storing portion 2 to the sheet conveying path 30. The plurality of conveying roller pairs 32 convey the sheet 9 along the sheet conveying path 30. In addition, one pair out of the plurality of conveying roller pairs 32 discharges the sheet 9 onto a discharge tray 101 from the sheet conveying path 30.

The printing device 4 executes the print processing on the sheet 9 conveyed along the sheet conveying path 30. In the present embodiment, the printing device 4 is a tandem-type color printing device.

The printing device 4 forms a toner image on the sheet 9 conveyed along the sheet conveying path 30. The toner image is an image that uses toner as developer. The toner is an example of granulated developer.

The printing device 4 includes a plurality of monochromatic image forming portions 4*x*, a laser scanning unit 40, a transfer deice 44, and a fixing device 46. In the present embodiment, the printing device 4 includes four monochromatic image forming portions 4*x* respectively corresponding to four colors of yellow, cyan, magenta, and black.

Each of the monochromatic image forming portions 4*x* includes a drum-type photoconductor 41, a charging device 42, a developing device 43, a drum cleaning device 45, and the like.

In each of the monochromatic image forming portions 4*x*, the photoconductor 41 rotates, and the charging device 42 executes charging processing. The charging processing is processing of charging a surface of the photoconductor 41. Further, the laser scanning unit 40 scans laser light to thus form an electrostatic latent image on the charged surface of the photoconductor 41.

The laser scanning unit 40 is an example of a latent image forming portion which forms the electrostatic latent image on the charged surface of the photoconductor 41.

Furthermore, the developing device 43 supplies the toner to the surface of the photoconductor 41 to thus develop the electrostatic latent image into the toner image. The developing device 43 supplies the toner to the photoconductor 41 at a developing position on an outer circumference of the photoconductor 41. The developing device 43 is an example of a developing portion.

The charging device 42 includes a charging member 421 and a charging voltage output device 422. The charging member 421 is arranged opposed to the photoconductor 41 at a charging position on the outer circumference of the photoconductor 41. The charging voltage output device 422 applies a charging bias voltage to the charging member 421. The charging bias voltage is a bias voltage applied in the charging processing.

The charging bias voltage is applied to the photoconductor 41 from the charging voltage output device 422 via the charging member 421. Thus, the surface of the photoconductor 41 is charged. The charging device 42 is an example of a charging portion.

The developing device 43 includes a developing roller 431 and a developing voltage output device 432. The developing roller 431 is arranged opposed to the photoconductor 41 at the developing position. The developing roller 431 rotates while carrying toner.

The developing voltage output device 432 applies a developing bias voltage to the developing roller 431. In the present embodiment, the developing bias voltage is a voltage in which an AC voltage is superimposed on a DC voltage.

The developing roller 431 rotates while carrying toner and supplies the toner to the surface of the photoconductor 41 at the developing position. The developing roller 431 is an example of a developing member. The developing voltage output device 432 is an example of a developing voltage output portion.

The toner carried by the developing roller 431 shifts to a portion of the electrostatic latent image on the surface of the photoconductor 41 by an electric field generated between the developing roller 431 and the photoconductor 41.

At the developing position, the toner shifts from the developing roller 431 to the portion of the electrostatic latent image on the surface of the photoconductor 41. Thus, the electrostatic latent image is developed into the toner image. The four photoconductors 41 are each an example of an image-carrying member which carries the toner image.

As described heretofore, the laser scanning unit 40 and the four monochromatic image forming portions 4*x* are capable of forming the toner images on the surfaces of the photoconductors 41. The laser scanning unit 40 and each of the four monochromatic image forming portions 4*x* are an example of an image forming portion.

In the present embodiment, the developing device 43 performs development using a two-component development system. In other words, the developing device 43 stirs the two-component developer containing the toner and a magnetic carrier to charge the toner. In addition, the developing device 43 supplies the charged toner to the photoconductor 41.

The magnetic carrier is a granulated carrier having a magnetic property. For example, the magnetic carrier is a granulated magnetic body having a coated surface. The coating is constituted of a synthetic resin such as an epoxy resin, for example.

The transfer deice 44 includes an intermediate transfer belt 441, four primary transfer devices 442 corresponding to the four monochromatic image forming portions 4*x*, a secondary transfer device 443, and a belt cleaning device 444.

The intermediate transfer belt 441 is supported by a plurality of support rollers 440. One of the plurality of support rollers 440 rotates by power received from a motor (not shown). Thus, the intermediate transfer belt 441 rotates.

Each of the photoconductors 41 is in contact with the intermediate transfer belt 441 at a primary transfer position on the outer circumference of each of the photoconductors 41.

Each of the primary transfer devices 442 is capable of executing primary transfer processing. The primary transfer processing is processing of transferring the toner image formed on the surface of the photoconductor 41 onto a surface of the intermediate transfer belt 441 at the primary transfer position.

By the plurality of primary transfer devices 442 executing the primary transfer processing, the toner images of the plurality of colors are formed on the surface of the intermediate transfer belt 441.

Each of the primary transfer devices 442 includes a primary transfer member 4421 and a primary voltage output device 4422. The primary transfer member 4421 is arranged opposed to the photoconductor 41 via the intermediate transfer belt 441.

The primary voltage output device 4422 applies a primary transfer bias voltage to the primary transfer member 4421. The toner image formed on the surface of the photoconductor 41 is transferred onto the surface of the intermediate transfer belt 441 by an electric field generated between the photoconductor 41 and the primary transfer member 4421. A polarity of the primary transfer bias voltage is opposite to a charging polarity of the toner.

The secondary transfer device 443 is capable of executing secondary transfer processing. The secondary transfer processing is processing of transferring the toner image formed on the intermediate transfer belt 441 onto the sheet 9 at a secondary transfer position on the sheet conveying path 30.

The secondary transfer device 443 includes a secondary transfer member 4431 and a secondary voltage output device 4432. The secondary transfer member 4431 is in contact with the intermediate transfer belt 441 at the secondary transfer position. The sheet 9 passes between the intermediate transfer belt 441 and the secondary transfer member 4431.

The secondary voltage output device 4432 applies a secondary transfer bias voltage to the secondary transfer member 4431. The toner image formed on the surface of the intermediate transfer belt 441 is transferred onto the sheet 9 by an electric field generated between the intermediate transfer belt 441 and the secondary transfer member 4431. A polarity of the secondary transfer bias voltage is opposite to the charging polarity of the toner.

It is noted that the intermediate transfer belt 441 is an example of an intermediate transfer member. The transfer deice 44 is an example of a transfer portion which is capable of executing the primary transfer processing and the secondary transfer processing.

The drum cleaning device 45 executes toner recovery processing. The toner recovery processing is processing of recovering toner present at a portion of the surface of the photoconductor 41 that has passed through the primary transfer position.

In addition, the drum cleaning device 45 is also capable of executing toner release processing. The toner release processing is processing of releasing the toner recovered from the surface of the photoconductor 41 to the surface of the photoconductor 41. The drum cleaning device 45 is an example of a cleaning portion.

The drum cleaning device 45 includes a recovery member 451 and a recovery voltage output device 452. The recovery member 451 is a member which is capable of retaining the toner. For example, the recovery member 451 is a porous member such as a sponge.

The recovery member 451 rotates while being in contact with the surface of the photoconductor 41. The recovery member 451 is in contact with the surface of the photoconductor 41 at a recovery position on the outer circumference of the photoconductor 41. The recovery position is a position between the primary transfer position and the charging position on the outer circumference of the photoconductor 41.

The recovery voltage output device 452 is capable of applying a recovery bias voltage or a release bias voltage to the recovery member 451. The recovery voltage output device 452 is an example of a recovery voltage output portion.

The recovery bias voltage is a voltage having a polarity different from the charging polarity of the toner. The release bias voltage is a voltage having a polarity that is the same as the charging polarity of the toner.

The recovery voltage output device 452 applies the recovery bias voltage to the recovery member 451 in the toner recovery processing. Thus, the toner on the surface of the photoconductor 41 is electrically drawn to the recovery member 451 to be retained by the recovery member 451. The toner recovered by the recovery member 451 is accumulated in a plurality of holes formed on a surface of the recovery member 451.

Meanwhile, the recovery voltage output device 452 applies the release bias voltage to the recovery member 451 in the toner release processing. Thus, the toner retained by the recovery member 451 is electrically drawn to the surface of the photoconductor 41 to thus be released from the recovery member 451 to the surface of the photoconductor 41.

The recovery processing is executed when the print processing is executed. By executing the recovery processing, the toner that has not been transferred onto the intermediate transfer belt 441 at the primary transfer position is recovered by the recovery member 451.

However, the accumulation of the toner in the recovery member 451 lowers toner recovery performance of the recovery member 451.

Meanwhile, the release processing is executed when a predetermined release condition is satisfied under a situation where the print processing is not executed. By executing the release processing, the toner recovery performance of the recovery member 451 is improved.

In the present embodiment, the developing voltage output device 432 is also capable of outputting a drawing bias voltage to the developing roller 431. The drawing bias voltage is a voltage having a polarity different from the charging polarity of the toner.

When the release processing is executed, the developing voltage output device 432 applies the drawing bias voltage to the developing roller 431. Thus, the toner released from the recovery member 451 is recovered in the developing device 43 by the developing roller 431.

The belt cleaning device 444 removes the toner remaining at a portion of the intermediate transfer belt 441 that has passed through the secondary transfer position.

The fixing device 46 heats and pressurizes the toner image on the sheet 9. Thus, the fixing device 46 fixes the toner image onto the sheet 9.

The operation device 801 is a device which accepts operations of people. For example, the operation device 801 includes an operation button and a touch panel.

The display device 802 is a device which displays information. For example, the display device 802 includes a panel display device such as a liquid crystal display unit.

The image forming apparatus 10 further includes a concentration sensor 5 (see FIG. 1). The concentration sensor 5 detects a concentration of a toner image at a portion of the surface of the intermediate transfer belt 441 that has passed through the secondary transfer position.

The concentration sensor 5 detects a concentration of the toner image at a position between the secondary transfer position and a position of the belt cleaning device 444 on an outer circumference of the intermediate transfer belt 441.

For example, the concentration sensor 5 is a CIS (Contact Image Sensor). The concentration sensor 5 is an example of a concentration detection portion which detects a concentration of the toner image on the intermediate transfer belt.

[Configuration of Control Device 8]

Figure 2:
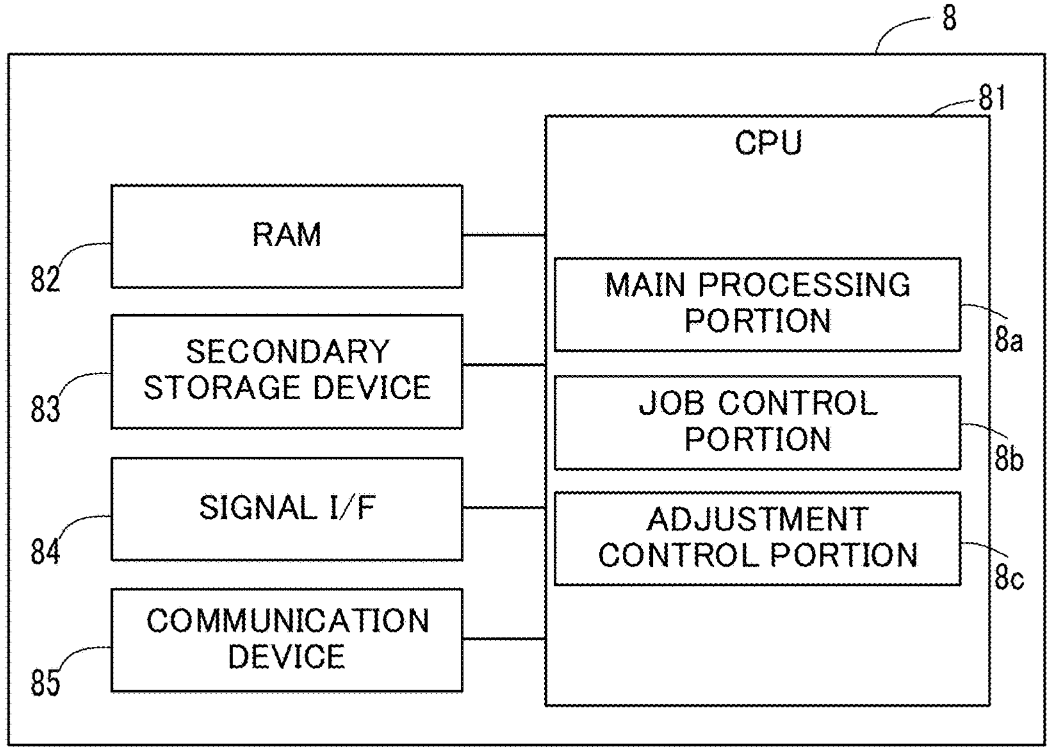
FIG. 2 is a block diagram showing a configuration of a control device in the image forming apparatus according to the embodiment.

As shown in FIG. 2, the control device 8 includes a CPU (Central Processing Unit) 81, a RAM (Random Access Memory) 82, a secondary storage device 83, a signal interface 84, a communication device 85, and the like.

The secondary storage device 83 is a nonvolatile computer-readable storage device. The secondary storage device 83 is capable of storing and updating computer programs and various types of data. For example, one or both of a flash memory and a hard disk drive is/are adopted as the secondary storage device 83.

The signal interface 84 converts signals output from various sensors into digital data and transmits the digital data obtained by the conversion to the CPU 81. In addition, the signal interface 84 converts control instructions output from the CPU 81 into control signals and transmits the control signals to control target devices.

The communication device 85 executes communication with other apparatuses such as a host apparatus (not shown). The CPU 81 communicates with the other apparatuses via the communication device 85.

The CPU 81 is a processor which executes the computer programs to thus execute various types of data processing and control. The control device 8 including the CPU 81 controls the sheet conveying device 3, the printing device 4, the display device 802, the communication device 85, and the like.

The RAM 82 is a volatile computer-readable storage device. The RAM 82 primarily stores the computer programs to be executed by the CPU 81 and data to be output and referenced by the CPU 81 during a process of executing the various types of processing.

The CPU 81 includes a plurality of processing modules that are realized by executing the computer programs. The plurality of processing modules include a main processing portion 8*a*, a job control portion 8*b*, an adjustment control portion 8*c*, and the like.

The main processing portion 8*a* executes processing of causing the various types of processing to be started, control of the display device 802, and the like according to operations made to the operation device 801.

The job control portion 8*b* controls the sheet conveying device 3. Thus, the job control portion 8*b* controls feeding of the sheets 9 from the sheet storing portion 2 and conveyance of the sheets 9 on the sheet conveying path 30.

In addition, the job control portion 8*b* controls the printing device 4. The job control portion 8*b* causes the printing device 4 to execute the print processing in sync with the conveyance of the sheet 9 by the sheet conveying device 3.

The adjustment control portion 8*c* determines whether or not the release condition is satisfied under the situation where the print processing is not executed. For example, the release condition is a condition that is satisfied every time the number of times of page printing reaches a predetermined number of times. The page printing is the print processing for one page of the sheet 9.

In addition, the adjustment control portion 8*c* executes reproduction control when it is determined that the release condition is satisfied.

In the reproduction control, the adjustment control portion 8*c* causes the drum cleaning device 45 to execute the toner release processing.

In addition, in the reproduction control, the adjustment control portion 8*c* causes the developing voltage output device 432 to output the drawing bias voltage.

Meanwhile, in the reproduction control, the adjustment control portion 8*c* does not cause the charging voltage output device 422 to output a voltage and does not cause the laser scanning unit 40 to form the electrostatic latent image.

Incidentally, due to repetitions of the toner recovery and toner release by the recovery member 451, toner release performance of the recovery member 451 is gradually lowered. When the toner release performance of the recovery member 451 is lowered, the toner recovery performance of the recovery member 451 is also lowered. If the performance of the recovery member 451 is lowered, there is a fear that useless toner will remain on the surface of the photoconductor 41.

Figure 5:
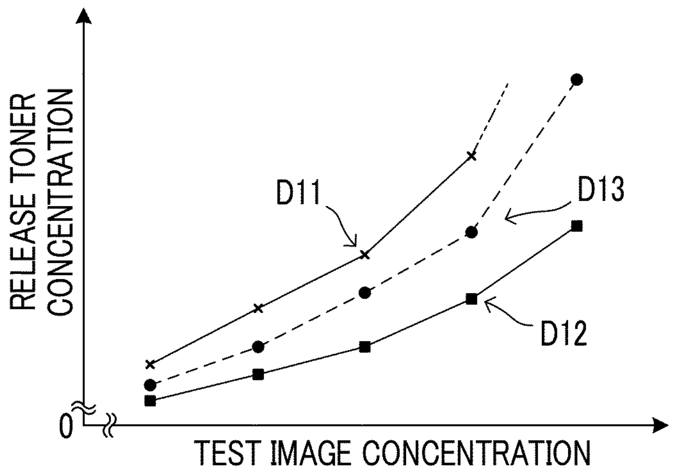
FIG. 5 is a graph showing a relationship between a test image concentration and a release toner concentration under three measurement conditions related to the number of times of printing and a control parameter in the image forming apparatus.

FIG. 5 is a graph showing a relationship between a test image concentration and a release toner concentration under three measurement conditions in the image forming apparatus 10. The abscissa axis in the graph represents the test image concentration, and the ordinate axis represents the release toner concentration.

The test image concentration is a concentration of a test image formed on the surface of the photoconductor 41. The test image concentration is a concentration in image data expressing the test image.

The release toner concentration is a concentration of toner released to the surface of the photoconductor 41 when the release processing for the test image is executed.

Specifically, when the test image is formed on the surface of the photoconductor 41, the recovery processing is executed without execution of the primary transfer processing. When the release processing is executed in this manner, the primary transfer device 442 executes the primary transfer processing for the release toner on the surface of the photoconductor 41.

Further, the concentration sensor 5 detects a concentration of the release toner on the surface of the intermediate transfer belt 441. The concentration detected by the concentration sensor 5 at this time is the release toner concentration.

It is noted that when the concentration detection by the concentration sensor 5 is performed after the release processing is executed, the output of the secondary transfer bias voltage by the secondary voltage output device 4432 is not performed.

A first measurement condition out of the three measurement conditions is a condition that, in an initial state of the image forming apparatus 10, a reference release voltage has been applied as the release bias voltage to the recovery member 451.

A second measurement condition out of the three measurement conditions is a condition that, in a load test state of the image forming apparatus 10, the reference release voltage has been applied as the release bias voltage to the recovery member 451. The load test state is a state obtained after each of the page printing accompanying the toner recovery processing and the toner release processing has been executed a predetermined number of times from the initial state.

A third measurement condition out of the three measurement conditions is a condition that, in the load test state of the image forming apparatus 10, a correction release voltage has been applied as the release bias voltage to the recovery member 451. The correction release voltage is a bias voltage that is larger than the reference release voltage.

In FIG. 5, first measurement data D11, second measurement data D12, and third measurement data D13 are data of a plurality of the release toner concentrations respectively corresponding to a plurality of the test image concentrations.

The first measurement data D11 is data obtained under the first measurement condition, the second measurement data D12 is data obtained under the second measurement condition, and the third measurement data D13 is data obtained under the third measurement condition.

A difference between the first measurement data D11 and the second measurement data D12 indicates that, by the repetitions of the toner recovery processing and the toner release processing, the toner release performance of the recovery member 451 is lowered.

A difference between the second measurement data D12 and the third measurement data D13 indicates that the deteriorated performance of the recovery member 451 can be compensated for by correcting the release bias voltage.

The residual toner on the surface of the photoconductor 41 becomes a cause of poor print image quality. Meanwhile, when the performance of the recovery member 451 is evaluated correctly, the deteriorated performance of the recovery member 451 can be compensated for by correcting a control parameter such as the recovery bias voltage or the release bias voltage.

Figure 3:
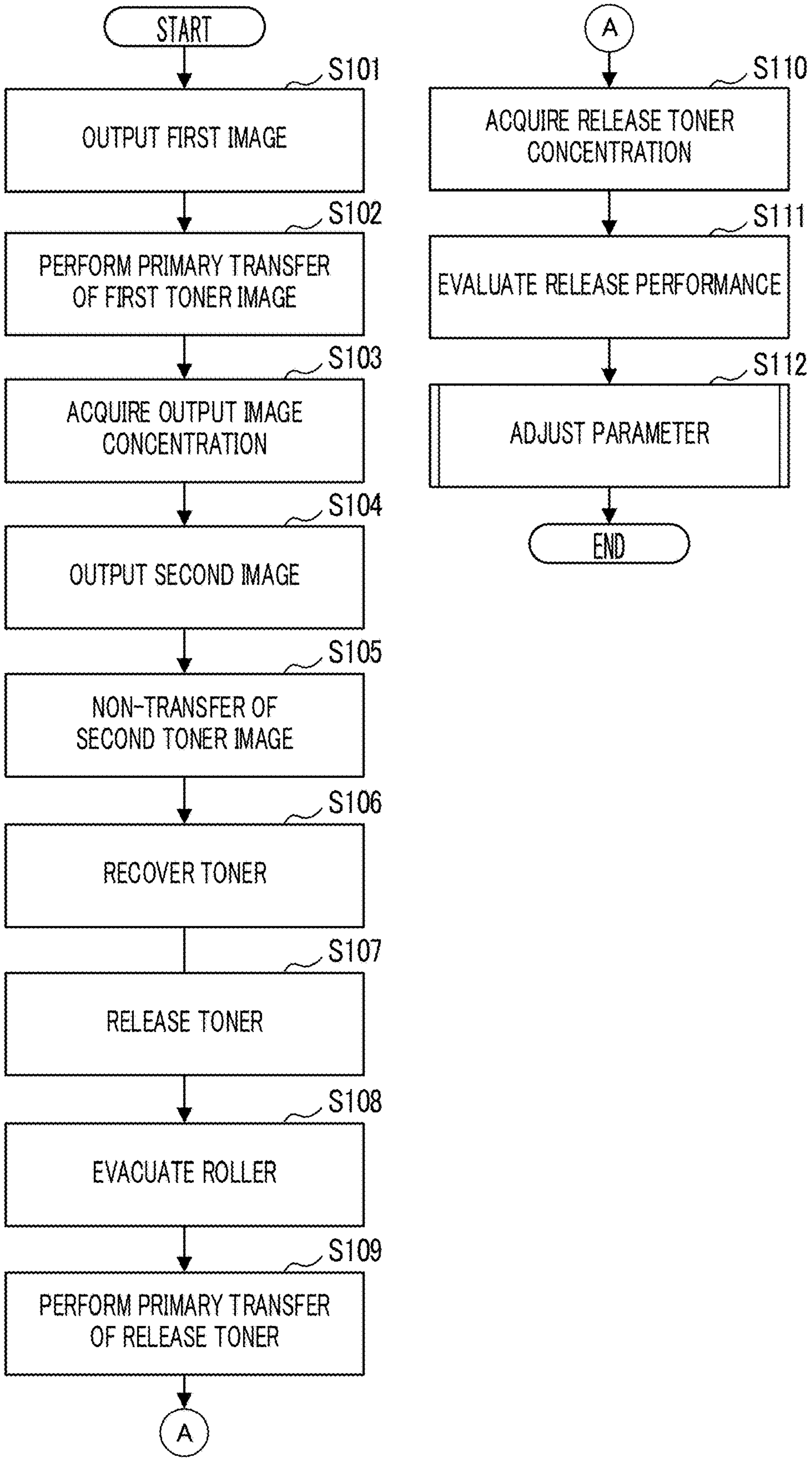
FIG. 3 is a flowchart showing exemplary procedures of toner recovery adjustment processing in the image forming apparatus according to the embodiment.

In the image forming apparatus 10, the adjustment control portion 8*c* is capable of executing toner recovery adjustment processing (see FIG. 3). Thus, the performance of the recovery member 451 that recovers the toner on the surface of the photoconductor 41 is evaluated correctly. In addition, the control parameter is corrected according to an evaluation result on the performance of the recovery member 451.

[Toner Recovery Adjustment Processing]

The adjustment control portion 8*c* executes the toner recovery adjustment processing when a predetermined adjustment condition is satisfied under the situation where the print processing is not executed. The adjustment control portion 8*c* executes the toner recovery adjustment processing for each of the monochromatic image forming portions 4*x*.

The adjustment control portion 8*c* determines whether or not the adjustment condition is satisfied under the situation where the print processing is not executed. For example, the adjustment condition includes one or both of a number-of-times-of-printing condition and a residual toner condition.

The number-of-times-of-printing condition is a condition that the number of times of page printing has reached a predetermined number of times while using a usage start time point of the image forming apparatus 10 or a time point at which the last toner recovery adjustment processing has been executed as a reference.

The residual toner condition is a condition that the detection concentration of the concentration sensor 5 obtained when the print processing is executed has exceeded an allowable concentration.

Hereinafter, exemplary procedures of the toner recovery adjustment processing will be described with reference to the flowchart shown in FIG. 3.

It is noted that the toner recovery adjustment processing is an example of processing for realizing a control method of the image forming apparatus 10. The CPU 81 is an example of a processor which realizes the control method of the image forming apparatus 10.

In descriptions below, S101, S102, . . . represent identification codes of a plurality of steps in the toner recovery adjustment processing. In the toner recovery adjustment processing, processing of Step S101 is executed first.

<Step S101>

In Step S101, the adjustment control portion 8*c* causes the monochromatic image forming portion 4*x* and the laser scanning unit 40 to execute first image output processing.

The first image output processing is processing of forming a first toner image on the surface of the photoconductor 41. For example, the first toner image is a patch image having a predetermined concentration.

After executing the processing of Step S101, the adjustment control portion 8*c* shifts the processing to Step S102.

<Step S102>

In Step S102, the adjustment control portion 8*c* causes the primary transfer device 442 to execute the primary transfer processing for the first toner image.

Specifically, the adjustment control portion 8*c* causes the primary voltage output device 4422 to output the primary transfer bias voltage when the first toner image passes through the primary transfer position.

After executing the processing of Step S102, the adjustment control portion 8*c* shifts the processing to Step S103.

<Step S103>

In Step S103, the adjustment control portion 8*c* acquires an output image concentration from the concentration sensor 5. The output image concentration is the detection concentration of the concentration sensor 5 for the first toner image.

Specifically, the adjustment control portion 8*c* acquires, as the output image concentration, the detection concentration of the concentration sensor 5 obtained when the first toner image passes through the position of the concentration sensor 5.

It is noted that when the toner recovery adjustment processing is executed, the adjustment control portion 8*c* does not cause the secondary voltage output device 4432 to output the secondary transfer bias voltage. For example, the adjustment control portion 8*c* causes the secondary voltage output device 4432 to output a bias voltage having a polarity opposite to that of the secondary transfer bias voltage. Thus, the toner transferred onto the intermediate transfer belt 441 is removed by the belt cleaning device 444 after passing through the secondary transfer position and the position of the concentration sensor 5.

Further, when the toner recovery adjustment processing is executed, the adjustment control portion 8*c* may cause the secondary voltage output device 4432 to output a bias voltage having a polarity that is the same as the charging polarity of the toner.

After executing the processing of Step S103, the adjustment control portion 8*c* shifts the processing to Step S104.

<Step S104>

In Step S104, the adjustment control portion 8*c* causes the monochromatic image forming portion 4*x* and the laser scanning unit 40 to execute second image output processing.

The second image output processing is processing of forming a second toner image on the surface of the photoconductor 41. The second toner image is a toner image that is the same as the first toner image.

After executing the processing of Step S104, the adjustment control portion 8*c* shifts the processing to Step S105.

<Step S105>

In Step S105, the adjustment control portion 8*c* causes the primary transfer device 442 to execute the non-transfer processing in which the second toner image is not transferred onto the intermediate transfer belt 441.

Specifically, in Step S105, the adjustment control portion 8*c* causes the primary voltage output device 4422 to output a bias voltage having a polarity that is the same as the charging polarity of the toner.

After executing the processing of Step S105, the adjustment control portion 8*c* shifts the processing to Step S106.

<Step S106>

In Step S106, the adjustment control portion 8*c* causes the drum cleaning device 45 to execute the toner recovery processing when the second toner image passes through the recovery member 451.

By executing the processing of Step S106, the toner constituting the second toner image is retained by the recovery member 451.

After executing the processing of Step S106, the adjustment control portion 8*c* shifts the processing to Step S107.

<Step S107>

In Step S107, the adjustment control portion 8*c* causes the drum cleaning device 45 to execute the release processing.

By executing the processing of Step S107 after the processing of Step S06, the toner constituting the second toner image is released to the surface of the photoconductor 41 from the recovery member 451. In descriptions below, the toner released to the surface of the photoconductor 41 by the processing of Step S107 will be referred to as the release toner.

After executing the processing of Step S107, the adjustment control portion 8*c* shifts the processing to Step S108.

<Step S108>

In Step S108, the adjustment control portion 8*c* executes roller evacuation control when the release toner passes through the developing position.

In the present embodiment, the developing device 43 includes a roller movement mechanism 433 which causes the developing roller 431 to move from an operation position to an evacuation position (see FIG. 1).

The operation position is a position at which toner can be supplied from the developing roller 431 to the photoconductor 41. The evacuation position is a position spaced more from the photoconductor 41 than the operation position. When the developing roller 431 is present at the evacuation position, the toner does not move between the photoconductor 41 and the developing roller 431.

For example, the roller movement mechanism 433 includes a motor and a cam mechanism that is driven by the motor. The cam mechanism is a mechanism which causes the developing roller 431 to move between the operation position and the evacuation position.

For example, the cam mechanism includes a spacer that is rotatably supported by a rotation shaft of the developing roller 431 and a drive mechanism that causes the spacer to rotate. The spacer is formed in an elliptical plate shape. The spacer comes into contact with the surface of the photoconductor 41 to thus retain an interval between the photoconductor 41 and the developing roller 431.

The roller evacuation control is control for causing the roller movement mechanism 433 to execute an operation of moving the developing roller 431 from the operation position to the evacuation position.

After executing the processing of Step S108, the adjustment control portion 8*c* shifts the processing to Step S109.

It is noted that the developing device 43 may alternatively include a carrier retention mechanism in place of the roller movement mechanism 433. The carrier retention mechanism includes a tube body, a magnet incorporated into the tube body, and a magnet movement mechanism.

The tube body is arranged opposed to the developing roller 431 in the developing device 43. The magnet movement mechanism causes the magnet to move between a proximal position and a spaced position.

In Step S108, the adjustment control portion 8*c* controls the magnet movement mechanism to thus retain the magnet at the proximal position.

At the proximal position, the magnet draws the magnetic carrier carried by the developing roller 431 together with the toner. Thus, the magnetic carrier carried by the developing roller 431 and the toner are retained between the developing roller 431 and the tube body without being conveyed to the developing position. As a result, the release toner passes through the developing position without coming into contact with the magnetic carrier.

Meanwhile, when development is performed by the developing device 43, the adjustment control portion 8*c* controls the magnet movement mechanism to thus retain the magnet at the spaced position. The spaced position is a position that is spaced more from the developing roller 431 than the proximal position. When the magnet is present at the spaced position, the magnetic carrier carried by the developing roller 431 and the toner are conveyed to the developing position.

<Step S109>

In Step S109, the adjustment control portion 8*c* causes the primary transfer device 442 to execute the primary transfer processing for the release toner.

Specifically, the adjustment control portion 8*c* causes the primary voltage output device 4422 to output the primary transfer bias voltage when the release toner on the surface of the photoconductor 41 passes through the primary transfer position.

After executing the processing of Step S109, the adjustment control portion 8*c* shifts the processing to Step S110.

<Step S110>

In Step S110, the adjustment control portion 8*c* acquires a release toner concentration from the concentration sensor 5. The release toner concentration is the detection concentration of the concentration sensor 5 for the release toner transferred onto the surface of the intermediate transfer belt 441.

Specifically, the adjustment control portion 8*c* acquires, as the release toner concentration, the detection concentration of the concentration sensor 5 obtained when the release toner on the intermediate transfer belt 441 passes through the position of the concentration sensor 5.

After executing the processing of Step S110, the adjustment control portion 8*c* shifts the processing to Step S111.

<Step S111>

In Step S111, the adjustment control portion 8*c* executes release performance evaluation processing. The release performance evaluation processing is processing of comparing the output image concentration and the release toner concentration to thus derive an index value of the toner release performance of the recovery member 451.

For example, the index value is a difference between the output image concentration and the release toner concentration or a ratio of the release toner concentration to the output image concentration.

After executing the processing of Step S111, the adjustment control portion 8*c* shifts the processing to Step S112.

<Step S112>

In Step S112, the adjustment control portion 8*c* executes parameter adjustment processing that is based on the index value of the toner release performance. The parameter adjustment processing will be described later.

After executing the processing of Step S112, the adjustment control portion 8*c* ends the toner recovery adjustment processing.

[Parameter Adjustment Processing]

Hereinafter, exemplary procedures of the parameter adjustment processing will be described with reference to the flowchart shown in FIG. 4.

In descriptions below, S201, S202, . . . represent identification codes of a plurality of steps in the parameter adjustment processing. In the parameter adjustment processing, processing of Step S201 is executed first.

<Step S201>

In Step S201, the adjustment control portion 8*c* determines whether or not the index value of the toner release performance is within a predetermined reference range or is deviated from the reference range.

When determining that the index value is within the reference range, the adjustment control portion 8*c* ends the parameter adjustment processing.

On the other hand, when determining that the index value is deviated from the reference range, the adjustment control portion 8*c* shifts the processing to Step S202.

<Step S202>

In Step S202, the adjustment control portion 8*c* determines whether or not the index value of the toner release performance is within a predetermined allowable range or is deviated from the allowable range. The allowable range is a range wider than the reference range.

When determining that the index value is within the allowable range, the adjustment control portion 8*c* shifts the processing to Step S203.

On the other hand, when determining that the index value is deviated from the allowable range, the adjustment control portion 8*c* shifts the processing to Step S206.

<Step S203>

In Step S203, the adjustment control portion 8*c* derives a correction value of one or a plurality of the control parameters according to the index value of the toner release performance.

The control parameter includes one or a plurality of parameters selected from the release bias voltage, the recovery bias voltage, a rotation speed of the recovery member 451, the primary transfer bias voltage, and the charging bias voltage.

As shown in FIG. 5, by correcting the release bias voltage to become a larger bias voltage, the toner release performance of the recovery member 451 can be compensated for. It is noted that the release bias voltage is a bias voltage applied in the release processing.

Further, when the toner release performance of the recovery member 451 is lowered, the toner recovery performance of the recovery member 451 is also lowered. By correcting the recovery bias voltage to become a larger bias voltage, the toner recovery performance of the recovery member 451 can be compensated for.

At a portion where the recovery member 451 comes into contact with the photoconductor 41, the surface of the recovery member 451 moves in the same direction as a movement direction of the surface of the photoconductor 41. By performing correction such that a circumferential speed of the recovery member 451 becomes slower than a circumferential speed of the photoconductor 41, an efficiency of the toner recovery by the recovery member 451 is improved. In other words, the toner recovery performance of the recovery member 451 is compensated for.

Furthermore, by correcting the primary transfer bias voltage to become a larger bias voltage, an amount of toner remaining on the surface of the photoconductor 41 is reduced. Thus, the toner recovery performance of the recovery member 451 is compensated for. It is noted that the primary transfer bias voltage is a bias voltage applied in the primary transfer processing.

Moreover, by correcting the charging bias voltage to become a larger bias voltage, an amount of toner remaining on the surface of the photoconductor 41 is reduced. Thus, the toner recovery performance of the recovery member 451 is compensated for.

After executing the processing of Step S203, the adjustment control portion 8*c* shifts the processing to Step S204.

<Step S204>

In Step S204, the adjustment control portion 8*c* determines whether or not the correction value derived in Step S204 is within a predetermined allowable correction range or is deviated from the allowable correction range.

When determining that the correction value is within the allowable correction range, the adjustment control portion 8*c* shifts the processing to Step S205. On the other hand, when determining that the correction value is deviated from the allowable correction range, the adjustment control portion 8*c* shifts the processing to Step S206.

<Step S205>

In Step S205, the adjustment control portion 8*c* corrects the control parameter according to the correction value derived in Step S203.

After executing the processing of Step S205, the adjustment control portion 8*c* ends the parameter adjustment processing.

<Step S206>

In Step S206, the adjustment control portion 8*c* executes warning processing for prompting a replacement of the recovery member 451. For example, the warning processing is processing of causing the display device 802 to display a predetermined message.

The processing of Step S206 is executed when the correction value of the control parameter or the index value is deviated from the allowable range. After executing the processing of Step S206, the adjustment control portion 8*c* ends the parameter adjustment processing.

By executing the toner recovery adjustment processing, the performance of the recovery member 451 is evaluated correctly. As a result, by executing the parameter adjustment processing, the deteriorated performance of the recovery member 451 is compensated for.

In addition, the adjustment control portion 8*c* may execute the processing of Step S101 to Step S110 a plurality of times under a plurality of output concentration conditions where the concentrations of the first toner image and the second toner image differ. For example, the output concentration condition is the number of drawing pixels in each of the first toner image and the second toner image. Alternatively, the output concentration condition may be an amount of beam light in the laser scanning unit 40.

The plurality of times of the processing of Step S101 to Step S110 include causing the monochromatic image forming portion 4*x* and the laser scanning unit 40 to execute the first image output processing and the second image output processing a plurality of times (see Step S102 and Step S104).

Further, the plurality of times of the processing of Step S101 to Step S110 include causing the transfer deice 44 to execute the primary transfer processing a plurality of times for the first toner image, the non-transfer processing a plurality of times for the second toner image, and the primary transfer processing a plurality of times for the release toner (see Step S102, Step S105, and Step S109).

Furthermore, the plurality of times of the processing of Step S101 to Step S110 include causing the drum cleaning device 45 to execute the toner recovery processing a plurality of times and the toner release processing a plurality of times for the second toner image (see Step S106 and Step S107).

When the processing of Step S101 to Step S110 is executed under the plurality of output concentration conditions, a plurality of pairs of the output image concentration and the release toner concentration are acquired in correspondence with the plurality of output concentration conditions.

In the case described above, in Step S111, the adjustment control portion 8*c* may derive the index value of the release performance based on the plurality of pairs of the output image concentration and the release toner concentration.

For example, the adjustment control portion 8*c* derives a plurality of index value candidates corresponding to the plurality of pairs of the output image concentration and the release toner concentration. In this case, the adjustment control portion 8*c* derives a representative value of the plurality of index value candidates as the index value. The representative value is, for example, an average value, a weighted average efficiency, a maximum value, or a minimum value.

Moreover, the adjustment control portion 8*c* may execute the processing of Step S101 to Step S111 in the initial state of the image forming apparatus 10. In this case, the adjustment control portion 8*c* records an initial index value obtained in Step S111 in the secondary storage device 83 as a reference value.

Then, in Step S111 in the toner recovery adjustment processing, the adjustment control portion 8*c* may derive a comparison value by comparing the output image concentration and the release toner concentration.

Further, the adjustment control portion 8*c* may derive a difference or ratio between the comparison value and the reference value as the index value. It is noted that the comparison value is a difference or ratio between the output image concentration and the release toner concentration.

Figure 4:
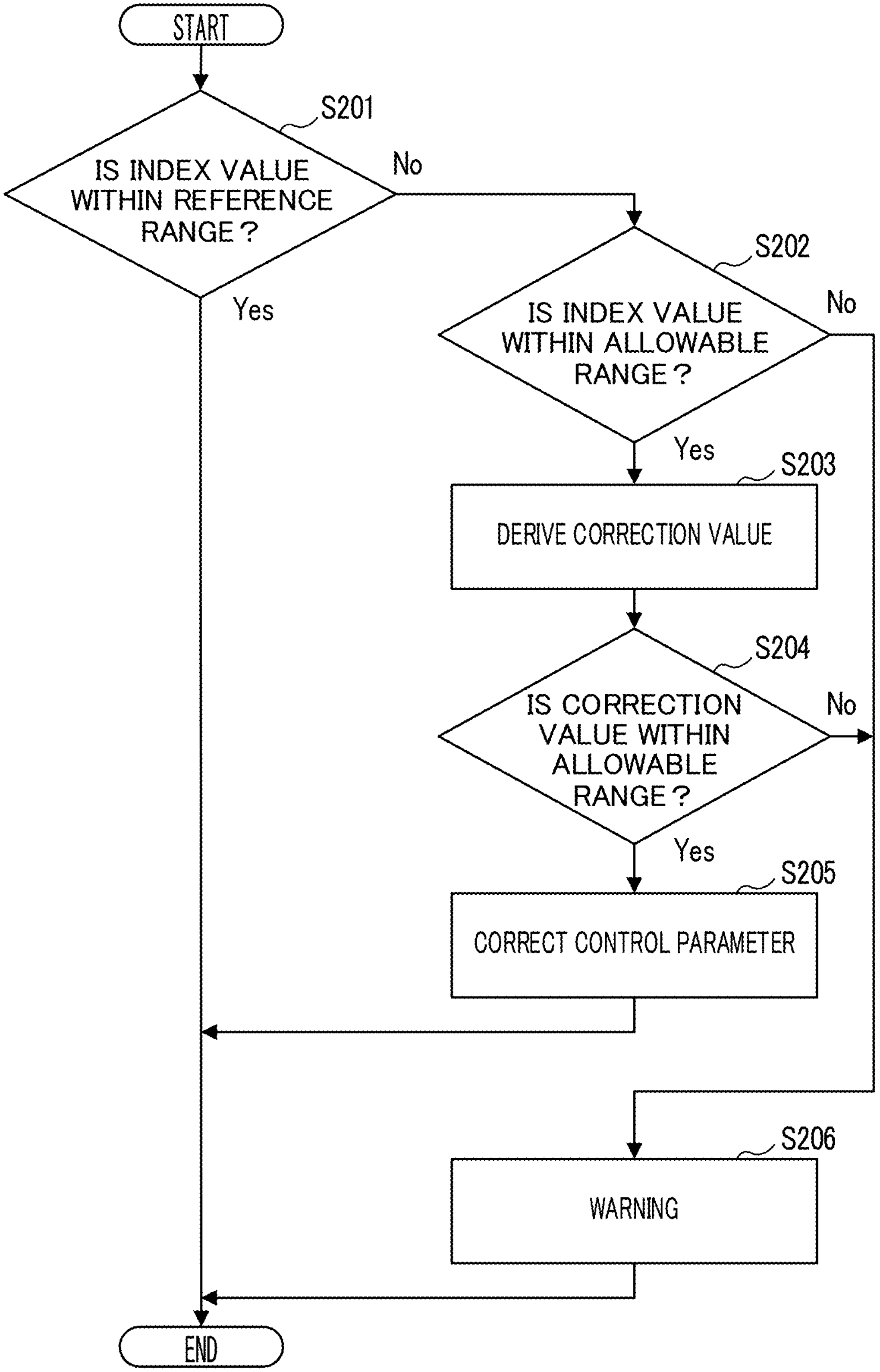
FIG. 4 is a flowchart showing exemplary procedures of parameter adjustment processing in the image forming apparatus according to the embodiment.

Alternatively, the adjustment control portion 8*c* may set the reference range of the index value based on the reference value (see Step S201 in FIG. 4).

Furthermore, the developing device 43 may be a device that uses an interactive touch-down development system or a jumping development system. In this case, the developing device 43 does not include the roller movement mechanism 433. In Step S108 in the toner recovery adjustment processing, the adjustment control portion 8*c* does not cause the developing voltage output device 432 to output a voltage.

The invention claimed is:

1. A control method of an image forming apparatus, the image forming apparatus including an image forming portion which includes a photoconductor that rotates, and is capable of forming a toner image on a surface of the photoconductor, a transfer portion which includes an intermediate transfer member that rotates, and is capable of executing primary transfer processing for transferring the toner image formed on the surface of the photoconductor onto a surface of the intermediate transfer member at a primary transfer position and secondary transfer processing for transferring the toner image formed on the surface of the intermediate transfer member onto a sheet at a secondary transfer position, a cleaning portion capable of executing toner recovery processing for recovering toner present at a portion of the surface of the photoconductor that has passed through the primary transfer position and toner release processing for releasing recovered toner to the surface of the photoconductor, and a concentration detection portion which detects a concentration of the toner image on the intermediate transfer member, the cleaning portion including a recovery member which rotates while being in contact with the surface of the photoconductor and is capable of retaining the toner, and a recovery voltage output portion which applies a recovery bias voltage having a polarity different from a charging polarity of the toner to the recovery member in the toner recovery processing, and applies a release bias voltage having a polarity that is the same as the charging polarity of the toner to the recovery member in the toner release processing, the control method comprising:

causing, by a processor, the image forming portion to execute first image output processing for forming a first toner image on the surface of the photoconductor;

causing, by the processor, the transfer portion to execute the primary transfer processing for the first toner image;

acquiring, by the processor, an output image concentration that is a detection concentration of the concentration detection portion for the first toner image;

causing, by the processor, the image forming portion to execute second image output processing for forming a second toner image that is the same as the first toner image on the surface of the photoconductor;

causing, by the processor, the transfer portion to execute non-transfer processing in which the second toner image is not transferred onto the intermediate transfer member;

causing, by the processor, the cleaning portion to execute the toner recovery processing when the second toner image passes through the recovery member;

causing, by the processor, the cleaning portion to execute the toner release processing after the toner recovery processing corresponding to the second toner image is executed;

causing, by the processor, the transfer portion to execute the primary transfer processing for release toner that has been released to the surface of the photoconductor by the toner release processing;

acquiring, by the processor, a release toner concentration that is a detection concentration of the concentration detection portion for the release toner that has been transferred onto the surface of the intermediate transfer member; and comparing, by the processor, the output image concentration and the release toner concentration to derive an index value of toner release performance of the recovery member.

2. The control method of an image forming apparatus according to claim 1, further comprising:

correcting, by the processor, one or a plurality of control parameters according to the index value.

3. The control method of an image forming apparatus according to claim 2, wherein the control parameter includes one or a plurality of parameters selected from the release bias voltage, the recovery bias voltage, a rotation speed of the recovery member, a primary transfer bias voltage that is applied in the primary transfer processing by the transfer portion, and a charging bias voltage that is applied in charging processing of the surface of the photoconductor by the image forming portion.

4. The control method of an image forming apparatus according to claim 2, further comprising:

executing, by the processor, warning processing when a correction amount of the control parameter or the index value is deviated from an allowable range.

5. The control method of an image forming apparatus according to claim 1, wherein the processor causes the image forming portion to execute the first image output processing and the second image output processing a plurality of times under a plurality of output concentration conditions where concentrations of the first toner image and the second toner image differ, the processor further causes the transfer portion to execute, under the plurality of output concentration conditions, the primary transfer processing a plurality of times for the first toner image, the non-transfer processing a plurality of times for the second toner image, and the primary transfer processing a plurality of times for the release toner, the processor further causes the cleaning portion to execute, under the plurality of output concentration conditions, the toner recovery processing a plurality of times and the toner release processing a plurality of times for the second toner image, and the processor further derives the index value based on a plurality of pairs of the output image concentration and the release toner concentration that are acquired in correspondence with the plurality of output concentration conditions.

6. An image forming apparatus, comprising:

an image forming portion which includes a photoconductor that rotates, and is capable of forming a toner image on a surface of the photoconductor;

a transfer portion which includes an intermediate transfer member that rotates, and is capable of executing primary transfer processing for transferring the toner image formed on the surface of the photoconductor onto a surface of the intermediate transfer member at a primary transfer position and secondary transfer processing for transferring the toner image formed on the surface of the intermediate transfer member onto a sheet at a secondary transfer position;

a cleaning portion capable of executing toner recovery processing for recovering toner present at a portion of the surface of the photoconductor that has passed through the primary transfer position;

a concentration detection portion which detects a concentration of the toner image on the intermediate transfer member; and a processor which realizes the control method of an image forming apparatus according to claim 1, wherein the cleaning portion includes a recovery member which rotates while being in contact with the surface of the photoconductor and is capable of retaining the toner, and a recovery voltage output portion which applies a recovery bias voltage having a polarity different from a charging polarity of the toner to the recovery member in the toner recovery processing.

* * * * *